Jan. 27, 1953 A. A. VARELA 2,627,029
SELF-PULSING OSCILLATOR
Filed Aug. 3, 1943
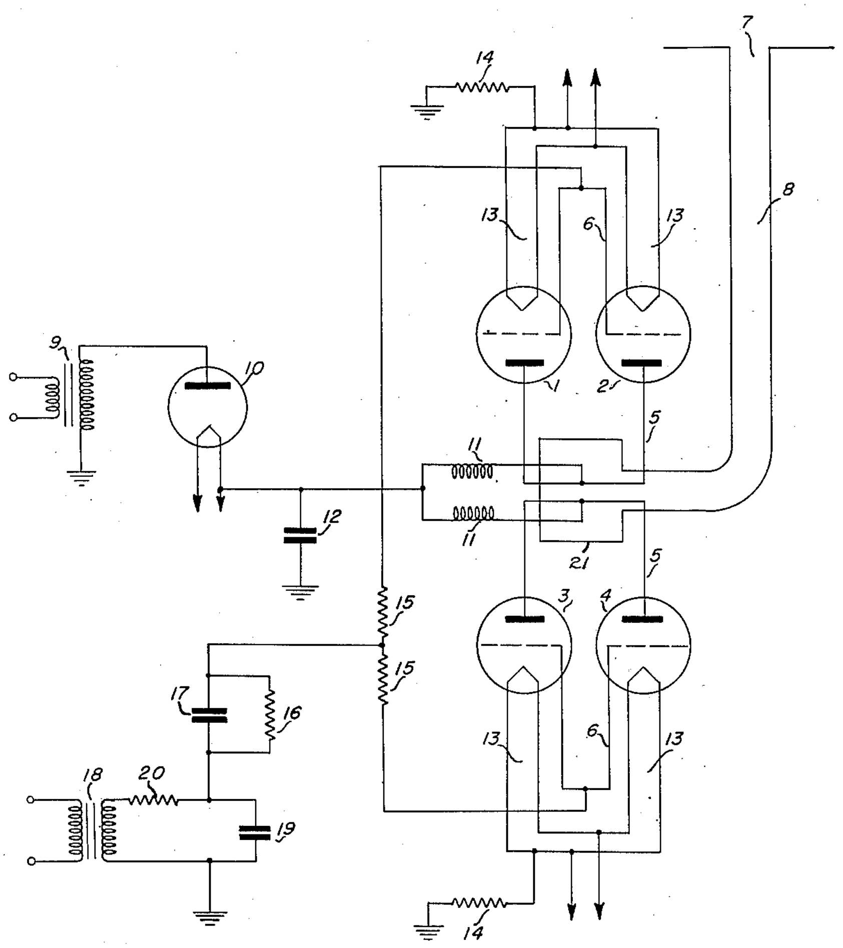
Inventor
ARTHUR A. VARELA
By P. E. Bush
Attorney Patented Jan. 27, 1953 2,627,029

UNITED STATES PATENT OFFICE 2,627,029

SELF-PULSING OSCILLATOR

Arthur A. Varela, Washington, D. C.

Application August 3, 1943, Serial No. 497,273

8 Claims. (Cl. 250—36)

(Granted under Title 35, U. S. Code (1952), sec. 266)

This invention relates to periodically operative oscillators for generating discrete successive wave groups. Such oscillators are employed in radio ranging systems operating by impulse transmission and echo reception. In particular the invention is directed to self-keying oscillators of this type.

In oscillators employing grid quenching through the provision of a suitable resistance and capacity in the grid circuit, the impulse frequency is dependent upon the RC time constant of the grid circuit components. Such oscillators obtain intermittent operation through the flow of grid current during a portion of the operating cycle. Upon oscillation, the direct component of the grid current causes the grid condenser to charge at a faster rate than it is discharged by the resistance. Consequently the grid receives an increasing negative bias until oscillation is finally blocked, whereupon the charge leaks off and the cycle repeats.

Due to the operation of the circuit wherein inauguration of oscillation depends on the grid voltage which is slowly varying at the end of an exponential decrease, the pulse intervals vary considerably from precise timing. In echo ranging systems where it is desired to maintain synchronism between the operation of the transmitter and receiver-indicator units, variation in transmitter pulse frequency may prevent satisfactory operation.

Accordingly, it is an object of the invention to provide means for obtaining synchronized pulsing of a self-keying pulse transmitter.

The invention will be further explained with reference to the drawing wherein the single figure discloses a schematic representation of a complete transmitter embodying the invention.

The high frequency transmitter shown in the drawing includes four triodes comprising two push-pull pairs 1 and 2, 3 and 4, in parallel. Each pair is provided with a plate tank 5 and grid tank 6. The antenna 7 may be coupled to the transmitter by a line 8 inductively coupled to the plate tanks by loop 21. Plate potential is supplied by power transformer 9 and rectifier 10, which feed the plate tanks through R. F. chokes 11. A storage capacitor 12 is connected between the output of rectifier 10 and ground.

The filaments of the oscillator triodes are energized through lines 13, and are grounded through self-biasing resistors 14.

The grid circuits 6 are returned to ground through equalizing resistors 15, and the R.-C. circuit including capacitor 17 and resistor 16.

These components establish the approximate pulse frequency desired, as above described.

Synchronism is obtained with the control frequency by injecting a control voltage in series between the cathod and grid to fire the oscillator on peaks of the injected alternations.

In the drawing, the synchronizing voltage is supplied through transformer 18 whose secondary is in series with the grid return. Consequently, the oscillator fires on the positive alternations of the injected voltage. As shown, this voltage is developed across capacitor 19. Transformer 18 is normally supplied with a power or audio frequency sine wave, condenser 19 presenting appreciable impedance thereto, but constituting a by-pass for the impulse current. Manifestly other frequencies and wave forms may be employed as desired. Resistor 20 is employed to obtain critical damping of the synchronizing circuit, as otherwise shock excitation by the transmitter grid impulse current may render operation uncertain. Where driving requirements are severe, condenser 19 may be designed for resonance with the secondary of transformer 18 at the synchronizing frequency. Critical damping of the resonant circuit may not be necessary, although some damping may be employed.

Preferably, the pulse frequency of the transmitter as determined by condenser 17 and resistor 16 in the grid circuit is somewhat lower than the synchronizing voltage frequency.

Through the employment of the invention, it is possible to obtain precise pulse frequency control of high power oscillators directly feeding the antenna without the employment of keyed amplifiers.

Although I have shown and described certain and specific embodiments of the invention, I am fully aware of the many modifications possible thereof. This invention is not to be restricted except insofar as is necessitated by prior art and the spirit of the appended claims.

The invention described herein may be manufactured and used by or for the Government of the United States of America for governmental purposes without the payment of any royalties thereon or therefor.

I claim:

1. In a pulse transmitter, a self-pulsing oscillator including an electron discharge device having a control grid and a quenching parallel resistance-capacity combination in the grid circuit, synchronizing means comprising a transformer receiving a synchronizing voltage having its secondary in series with the resistance-capacity combination in the grid circuit, and a capacitor connected across the secondary.

2. In a pulse transmitter, a self-pulsing oscillator including an electron discharge device having a control grid and a parallel resistance-capacity combination in the grid circuit, synchronizing means comprising a condenser in the grid circuit, a transformer receiving a synchronizing voltage having its secondary voltage applied to said condenser through a resistor, forming a critically damped circuit.

3. In a pulse transmitter, a self-pulsing oscillator including an electron discharge device having a control grid and a quenching parallel resistance-capacity combination in the grid circuit, synchronizing means comprising a transformer receiving a synchronizing voltage having its secondary in series with the resistance-capacity combination in the grid circuit, and a capacitor connected across the secondary having a value to resonate with said secondary at the synchronizing frequency.

4. In a self-pulsing synchronized oscillator, an electron discharge device having a control electrode, an oscillation quenching circuit in the circuit of said control electrode, a transformer receiving a synchronizing voltage having a secondary winding included in series with said oscillation quenching circuit in said control electrode circuit, and a capacitor in parallel with said secondary winding.

5. In a self-pulsing synchronized oscillator, an electron discharge device having a control electrode, an oscillation quenching circuit in the circuit of said control electrode, a transformer receiving a synchronizing voltage having a secondary winding included in series with said oscillation quenching circuit in said control electrode circuit, a capacitor in parallel with said secondary winding, and resistance means in series with said capacitor and said secondary winding to establish a critically damped circuit.

6. In a self-pulsing synchronized oscillator, an electron discharge device having a control electrode, an oscillation quenching parallel resistance-capacity combination in the circuit of said control electrode to determine the self-pulsing frequency of said oscillator, a transformer receiving a synchronizing voltage of a frequency higher than said self-pulsing frequency having a secondary winding included in series with said oscillation quenching circuit in said control electrode circuit, and a capacitance in parallel with said secondary winding.

7. In a self-pulsing synchronized oscillator, an electron discharge device having a control electrode, an oscillation quenching parallel resistance-capacity combination in the circuit of said control electrode to determine the self-pulsing frequency of said oscillator, a transformer receiving a synchronizing voltage of a frequency higher than said self-pulsing frequency having a secondary winding included in series with said oscillation quenching circuit in said control electrode circuit, a capacitance in parallel with said secondary winding, and resistance means in series with said capacitance and said secondary winding to establish a critically damped circuit.

8. In combination, a self pulsing oscillator including at least one grid controlled electron discharge device, an oscillation quenching circuit connected in the grid return circuit of said oscillator operative to produce periodic operation of said oscillator, and an alternating voltage synchronizing source having a frequency slightly higher than the self pulsing rate of said oscillator coupled in series with said quench circuit.

ARTHUR A. VARELA.

REFERENCES CITED

The following references are of record in the file of this patent:

UNITED STATES PATENTS

| Number | Name | Date |
|---|---|---|
| 1,728,816 | White | Sept. 17, 1929 |
| 1,769,270 | Ohl | July 1, 1930 |
| 1,896,417 | Page | Feb. 7, 1933 |
| 1,950,400 | Curtis | Mar. 13, 1934 |
| 2,010,253 | Barton | Aug. 6, 1935 |
| 2,181,568 | Kotowski | Nov. 28, 1939 |
| 2,225,046 | Hunter | Dec. 17, 1940 |
| 2,297,742 | Campbell | Oct. 6, 1942 |
| 2,358,297 | Bedford | Sept. 19, 1944 |
| 2,431,179 | Kentner | Nov. 18, 1947 |